Jan. 4, 1949.   R. R. CHIESA   2,457,868
MAGNETIC WINDSHIELD WIPER
Filed March 23, 1948   2 Sheets-Sheet 1
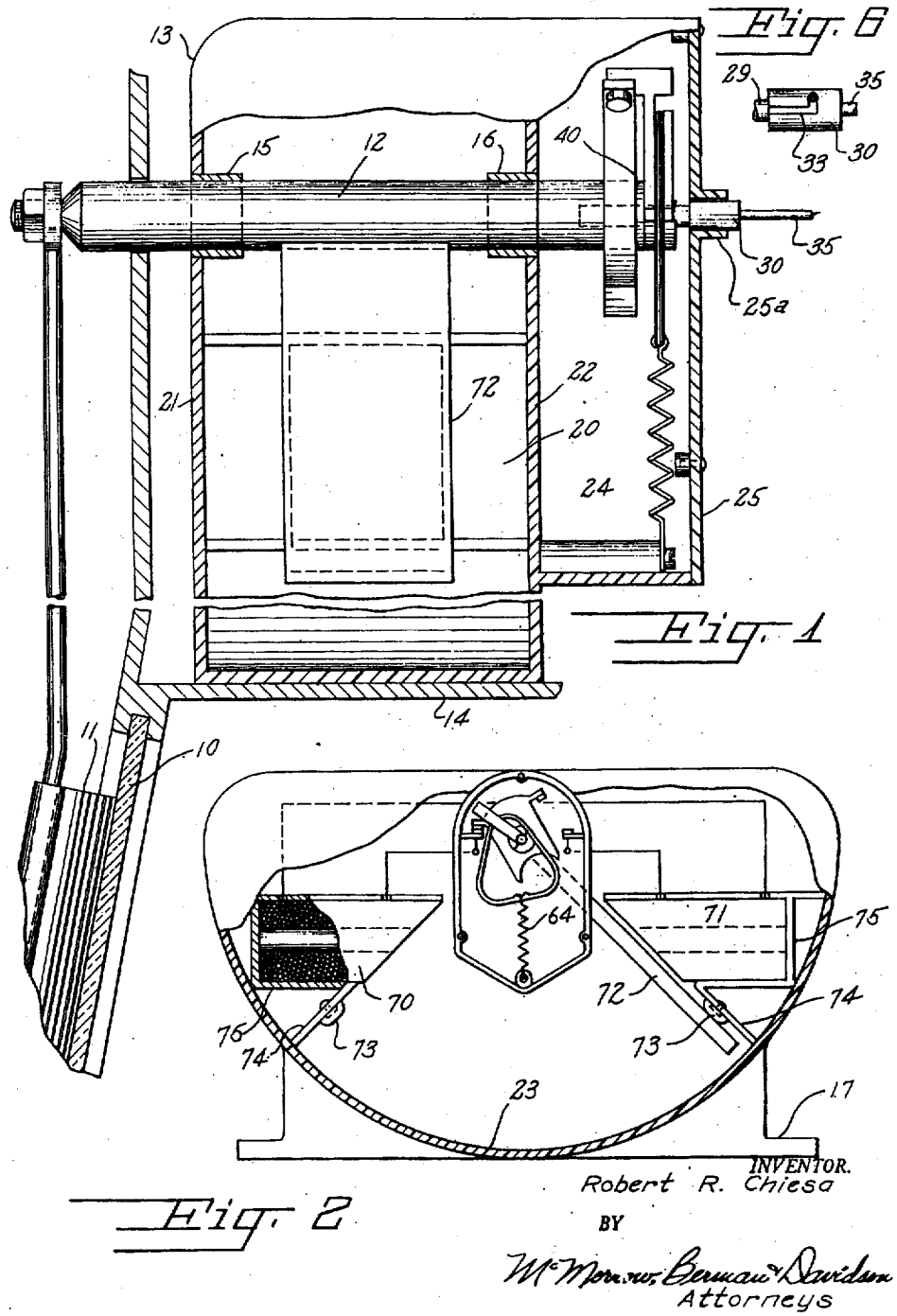
INVENTOR.
Robert R. Chiesa
BY
Attorneys Jan. 4, 1949.  R. R. CHIESA  2,457,868
MAGNETIC WINDSHIELD WIPER
Filed March 23, 1948  2 Sheets-Sheet 2
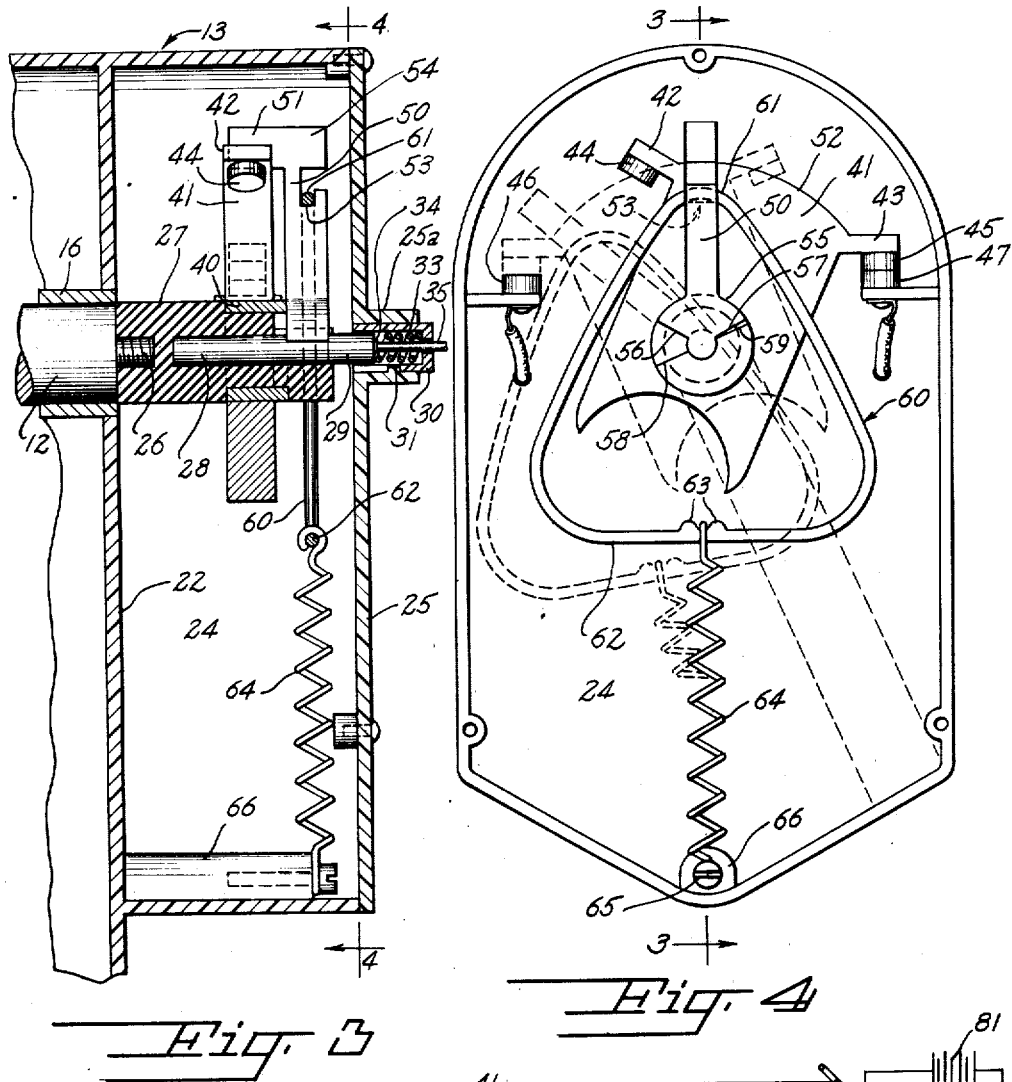
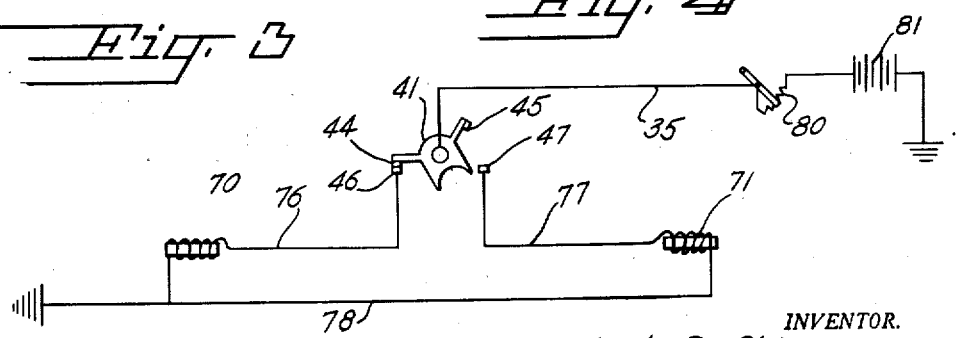
INVENTOR.
Robert R. Chiesa
BY
McMorrow, Berman & Davidson
Attorneys Patented Jan. 4, 1949

2,457,868

UNITED STATES PATENT OFFICE 2,457,868

MAGNETIC WINDSHIELD WIPER

Robert Richard Chiesa, Johnsonburg, Pa.

Application March 23, 1948, Serial No. 16,532

1 Claim. (Cl. 172—126)

This invention relates to magnetic windshield wipers.

An object of the invention is the provision of windshield wiper in which the mechanism for operating the wiper is embodied in a housing formed of Bakelite or any one of the well-known plastics, said mechanism including an arm for not only rocking a switch element but for conducting an electric current alternately to contacts included in circuits for energizing a pair of magnets, a cam actuating said arm and being rocked by the wiper shaft for causing the arm to rock the switch element for opening and closing the circuits alternately to the magnets, a spring actuating an eccentric carried by the arm for causing rapid closing of circuits by the switch element.

A further object of the invention is the provision of a windshield wiper which is operated magnetically by a mechanism within a housing formed of insulating materials, said mechanism causing rocking of an arm for actuating a control means for alternately closing circuits which include a pair of magnets, said magnets acting alternately on an armature attached to the wiper operating shaft for rocking the shaft and the arm, a spring actuated eccentric causing the arm to be rocked rapidly after the shaft has oscillated said arm through a predetermined degree.

The invention will be best understood from a consideration of the following detailed description in view of the accompanying drawing forming part of the specification, nevertheless it is to be understood that the invention is not confined to the disclosure, being susceptible of such changes and modifications which shall define no material departure from the salient features of the invention as expressed in the appended claims.

In the drawings:

Figure 1 is a transverse vertical section of my windshield wiper shown applied to an automobile, Figure 2 is a rear view of the operating mechanism with the housing partly in section, Figure 3 is a fragmentary vertical section taken along the line 3—3 of Figure 4, Figure 4 is a vertical section taken along the line 4—4 of Figure 3, Figure 5 shows more or less diagrammatically an electric circuit, and Figure 6 is a fragmentary side view of a closure for retaining a brush in an operative position.

Referring more particularly to the drawings 10 designates a windshield over which a wiper 11 is moved. Said wiper is oscillated by a shaft 12 received by an opening in the front wall of the automobile and extending transversely of the housing 13 supported on a projection 14. The housing has spaced bearings 15 and 16 for the shaft.

The housing 13 is preferably manufactured from any well-known plastic not only because of its cheapness but because of its insulating qualities. The housing has a base 17 resting on the extension or shelf 14. A compartment 20 is enclosed by a front wall 21 carrying the bearing 15, a rear wall 22 supporting the bearing 16, and an encircling wall having a semi-circular bottom 23 between the front and rear walls. A smaller compartment 24 projecting from the rear wall has a removable cover plate 25.

The inner end of the shaft 12 projects into the compartment 24 and is reduced and threaded as shown at 26 (Figure 3). A shaft 27 formed of Bakelite and screwed onto the threaded end 26 of the shaft 12 has a longitudinal axial passage receiving an axle 28 formed of steel or other conducting materials for a purpose which will be presently explained. A carbon brush 29 is received by a hollow boss 25a on the cover 25. A plastic cap 30 fitted into the boss is held in place by a lug 31 on the inner wall of the boss and a bayonet slot 32 formed in the cap (Figure 6). A spring 33 in the cap presses on the brush 28 and also on a contact 34 at the inner end of a wire 35 passing through an opening in the outer end of the cap. The spring maintains the contact in engagement with said brush and the brush in contact with the axle 28.

A brass ring 40 is fitted tightly on the outer end of the Bakelite extension 27 of the shaft 12. A rocking switch member 41 includes a lower end which is rotatably mounted on the ring 40. The upper end of the member 41 has oppositely disposed and outwardly projecting flanges 42 and 43 carrying respectively tungsten contacts 44 and 45. The contact 44 is adapted to engage a contact 46 while the contact 45 is moved into engagement with a contact 47. The contacts 46 and 47 are stationary and mounted on projections formed integrally with the walls of the chamber 24.

A rocker arm 50 has its lower end formed integrally with the axle 28 and extends radially upwardly therefrom. A laterally disposed finger 51 moves over a curved surface 52 of the switch member 41 and is adapted to engage alternately the flanges 42 and 43 for oscillating the switch member. The upper end of the arm has a seat 53 over which projects a protecting flange 54 for a purpose which will be explained presently.

An enlargement 55 having the outer face in the form of a sector of a circle provides a pair of inclined faces 56 and 57 (Figure 4).

The outer end of the extension 27 is cut-away horizontal along a diameter to provide oppositely disposed cams 58 and 59. These cams are adapted to engage alternately the inclined faces 56 and 57 respectively for causing the arm 50 to be rocked.

An eccentric 60, substantially triangular in shape and having the apices curved is formed of a continuous strip of Bakelite. The reduced upper end 61 of the eccentric is received by the seat 53 for swingably supporting said eccentric. The lower end 62 of the eccentric has a pair of spaced lugs 63 centrally located for receiving one end of a coil spring 64 therebetween. The other end of said spring is secured by a bolt 65 threaded into a boss 66 formed integrally with the bottom of the compartment 24.

Electro-magnets 70 and 71 are carried by the curved wall of the compartment 20 in horizontal alignment with the inner ends thereof facing each other for influencing an armature 72 formed of soft iron, secured to and depending from the shaft 12. Said inner ends of the magnets are sheared off at angles to provide opposed inner ends disposed radially of shaft 12 as shown in Figure 2 so that the armature may engage flatly either inclined end of the magnets. The magnets include the usual soft iron core and windings.

A rubber bumper 73 is mounted on a bracket 74 at each side of the compartment 20 and is adapted to be engaged by the armature when said armature swings to a magnet. The brackets support casings 75 for housing the magnets. The brackets and casings may be cast integrally with the housing 13.

Wires 76 and 77 (Figures 4 and 5) extend respectively from the contacts 46 and 47 to the adjacent ends of the coils of the respective magnets 70 and 71 the opposite ends of which are connected by a common lead 78 to the ground. The wire 35 is connected with a resistance switch 80 which is manually operated for varying the speed of the wiper 11. The switch is in circuit with a battery or source of current 81. The ring 40 engages the arm 50 for supplying current to the member 41 for the contacts 44 and 45.

The operation of my device is as follows: When the switch 80 is closed current will be supplied to one of the magnets since the spring 64 and the eccentric will cause the arm 50 to kick the rockable switch member 41 past dead center for closing one of the pair of contacts 44, 46 and 45, 47. As shown more particularly in Figure 4 it will be seen that the contacts 45 and 47 are in engagement for closing the circuit to the magnet 71. When switch 80 is closed the armature 72 is drawn to said magnet 71 while rocking the shaft 12 and the wiper 11. This motion causes the cam 59 to be moved into engagement with the face 57 of the rocker arm 50. Said cam will engage the face 57 and oscillate the arm 50 towards the left in Figure 4 so that the finger 51 will contact the flange 42 on the member 41 and rock said member towards the left whereby to break the circuit to magnet 71 and close the circuit to magnet 70.

The eccentric 60 and the spring 64 will cooperate to snap the arm 50 and member 41 towards the left after said arm passes dead center to the position shown in dotted lines in Figure 4. The contacts 44 and 46 are engaged and current flows to the magnet 70 whence the shaft 12 and armature are rocked to the left and the operations of the various members are reversed. At this time, the cam 58 acts on the member 56 at the lower end of the actuating arm 50 for kicking said arm to the right. The shaft 12 is rocked continuously in opposite directions for oscillating the wiper 11 until the switch 80 is opened.

The cooperating contacts 44, 46 and 45, 47 form in effect switches. The switches are opened and closed by the rockable member 41. The member 41 may be formed of Bakelite or other non-conducting materials with wires embedded therein running from the brass conducting ring 40 to the respective contacts 44 and 45 or the member 41 may be formed of conducting materials so that current will be supplied to said contacts by the member and through the medium of the ring 40 and the arm 50.

What I claim is:

A magnetically operated windshield wiper comprising a wiper shaft, an armature attached to and depending from the shaft, a magnet at each end of the path of rocking movement of the armature, a switch-operating member rockable on and insulated from the shaft, an electric circuit, switches in the circuit and closed in alternation by the switch operating member, an actuating arm rocking on the shaft and insulated therefrom, oppositely disposed flanges on the switch operating member, a finger on the actuating arm adapted to engage the flanges alternately for rocking the switch operating member, cooperating means between the shaft and arm for causing rocking of said arm on the shaft, a substantially triangularly shaped member carried eccentrically by the arm, and a spring connected to the lower end of said member and to a fixed point for tripping the arm after said arm has been rocked past dead center, the arm and the switch actuating member being in conductive relation with one end of the circuit, either switch completing the circuit.

ROBERT RICHARD CHIESA.

REFERENCES CITED

The following references are of record in the file of this patent:

UNITED STATES PATENTS

| Number | Name | Date |
|---|---|---|
| 1,568,210 | Colstad | Jan. 5, 1926 |